United States Patent [19]

Cornille, Jr.

[11] Patent Number: 5,273,341
[45] Date of Patent: Dec. 28, 1993

[54] HOOD SEALING APPARATUS FOR A MOTOR VEHICLE

[75] Inventor: Henry J. Cornille, Jr., Farmington Hills, Mich.

[73] Assignee: Ford Motor Company, Dearborn, Mich.

[21] Appl. No.: 980,938

[22] Filed: Nov. 23, 1992

[51] Int. Cl.$^5$ .................................. B62D 25/08
[52] U.S. Cl. .................. 296/194; 296/192; 180/69.2
[58] Field of Search ............... 296/194, 192; 180/68.3, 180/69.21, 69.2

[56] References Cited

U.S. PATENT DOCUMENTS

| | | | |
|---|---|---|---|
| 1,400,623 | 12/1921 | Oishei | 180/69.25 |
| 1,403,768 | 1/1922 | Griesedieck | 180/69.25 |
| 2,936,842 | 5/1960 | Fallin et al. | 180/69.21 |
| 4,114,714 | 9/1978 | Fachbach et al. | 180/69.21 |
| 4,598,786 | 7/1986 | Kirchweger | 180/68.1 |
| 4,646,864 | 3/1987 | Racchi | 180/69.25 |
| 4,655,496 | 4/1987 | Gahlau et al. | 296/194 |
| 4,909,566 | 3/1990 | Hashimoto et al. | 296/194 X |
| 4,943,102 | 7/1990 | Hamamoto et al. | 296/192 X |
| 5,022,479 | 6/1991 | Kiser et al. | 180/69.25 |

Primary Examiner—Joseph D. Pape
Attorney, Agent, or Firm—Raymond L. Coppiellie; Roger L. May

[57] ABSTRACT

A hood apparatus for covering an engine compartment of an automotive vehicle having a windshield, a ventilation opening disposed forward of the windshield and a cross rail member disposed between the ventilation opening and the engine compartment is disclosed. The apparatus includes a closure projection secured to the bottom face of the hood member at a predetermined location along the trailing edge of the hood member and disposed generally parallel to the transverse axis of the vehicle. The closure projection includes a generally planar web depending vertically from the bottom face of the hood member and having one edge secured thereto. A seal between the closure projection of the hood and a matingly shaped cross rail member of the vehicle body structure prevents engine compartment fumes from entering the passenger compartment ventilation opening. When the hood is opened, the closure projection moves upward and rearward to provide a clear engine service access path.

13 Claims, 2 Drawing Sheets

HOOD SEALING APPARATUS FOR A MOTOR VEHICLE

BACKGROUND OF THE INVENTION

1. Field of the Invention

The present invention relates generally to an automotive hood assembly for covering an engine compartment of the vehicle. More particularly, the present invention provides a hood assembly having a sealing member projecting therefrom which allows greater access to the engine compartment area.

2. Disclosure Information

With the advent of front wheel drive vehicles, smaller vehicles and the emergence and increasing use of "cab forward" vehicle designs wherein the passenger compartment of the vehicle is moved closer to the front end of the vehicle, the amount of available space in the engine compartment area of the vehicle is decreasing. It is becoming increasingly difficult to design vehicle bodies and engine compartments which provide more than a limited amount of access area to the engine compartment by the vehicle operator or a mechanic when the vehicle hood is in an open position.

FIG. 1 shows a typical known vehicle 10 including a hood member 12 disposed over an engine compartment 14 holding an engine 16 mounted parallel to the transverse axis of the vehicle as shown by line B. As illustrated, hood 12 is in the open position. The vehicle 10 further includes a windshield 18 disposed directly behind a ventilation opening 20 which provides fresh air intake to the vehicle passenger compartment. A dash panel 22 or other cross rail member such as the cowl is interposed between the engine compartment 14 and the ventilation opening 20. The dash panel 22 includes a sealing strip 24 fabricated from a synthetic polymeric material which prevents engine compartment fumes from passing through the ventilation opening 20 into the passenger compartment of the vehicle As shown in FIG. 1, the sealing strip 24 is disposed along the entire transverse length of the dash panel 22. When the hood 12 is closed, its trailing edge 26 compresses the seal 24 on the dash panel 22, thereby preventing engine compartment fumes from entering the ventilation opening 20. Alternatively, the seal 24 could be disposed along the entire transverse length of the trailing edge 26 of the hood member 12. Typically, the trailing edge 26 is generally linear between the outboard ends 28, 30 of the hood member 12.

FIG. 2 shows a cross sectional view along line 2—2 of FIG. 1 As shown in FIG. 2, line A—A defines the clearance path required to perform engine maintenance on the rearward side of the engine 16, such as, for example, replacing the engine spark plugs. The line A—A limits the forward position of the hood seal member 24. A "cab forward" design vehicle is shown in broken lines in FIG. 2. In the cab forward design, the windshield 18 is disposed forwardly along the longitudinal axis of the vehicle (line C, FIG. 1). The ventilation opening 20 must remain the approximate size as on prior art vehicles as to provide proper ventilation to the passenger compartment and therefore the opening 20 shifts forwardly as well. Because the opening 20 shifts forwardly, hood 12 must also shift forwardly resulting in the forward shifting of the hood seal 24 to be disposed in front of line A—A representing the access area to the rearward side of engine 16. In this instance, since the hood seal 24 is forward of the line defining the engine service access area, it is impossible for an operator to get to that area of the engine required to remove and replace the rear bank of spark plugs without partially or totally disconnecting the engine 16 from its mounts and moving it forward and/or down, resulting in a very significant increase in time and labor.

Therefore, it would be advantageous to provide some means to increase the access area to the engine compartment 14 while still providing the forward movement of the windshield 18.

SUMMARY OF THE INVENTION

The present invention solves the problems associated with the prior art hood member by providing in an automotive vehicle having a hood disposed over an engine compartment and mounted on the structure of the vehicle body, a sealing apparatus for providing a seal between the hood and the vehicle body structure which allows for greater access to the engine compartment. The vehicle includes a windshield, a ventilation opening disposed forward of the windshield and a cross rail member disposed between the ventilation opening and the engine compartment. The sealing apparatus comprises a seal engaging member secured to the trailing edge of the hood at a predetermined location between the outboard edges of the hood and disposed generally parallel to a transverse axis of the vehicle. The seal engaging member includes a generally planar web depending vertically from the hood and having one edge secured thereto and one free edge. The apparatus further includes an elastomeric strip interposed between the trailing edge of the hood and the cross rail member, the strip being operative to prevent passage of engine compartment fumes into the ventilation opening of the vehicle.

There is also disclosed herein a hood apparatus for covering an engine compartment of an automotive vehicle, the vehicle including a windshield, a ventilation opening disposed forward of the windshield and a cross rail member disposed between the ventilation opening and the engine compartment. The hood apparatus comprises a generally planar hood member having a leading edge, a trailing edge and a pair of outboard edges therebetween and defining a top face and a bottom face located above the engine compartment. The hood apparatus further comprises a closure projection secured to the bottom face of the hood member at a predetermined location along the trailing edge thereof and disposed generally parallel to a transverse axis of the vehicle. The closure projection includes a generally planar web depending vertically from the bottom face of the hood member and having one edge secured to the bottom face and one free edge, the closure projection being operative to prevent passage of contaminants from the ventilation opening into the engine compartment of the vehicle. In one embodiment of the invention, the cross rail member includes a generally arcuate-shaped depression disposed at a predetermined location along its transverse axis generally parallel to the transverse axis of the vehicle and wherein the free end of the web is configured to matingly engage the depression.

The present invention provides increased service access area to the vehicle engine when the windshield has been relocated forward to achieve a cab forward effect. These and other objects, features and advantages of the present invention will become apparent from the drawings, detailed description and claims which follow.

DETAILED DESCRIPTION OF THE PREFERRED EMBODIMENTS

Figure 1:
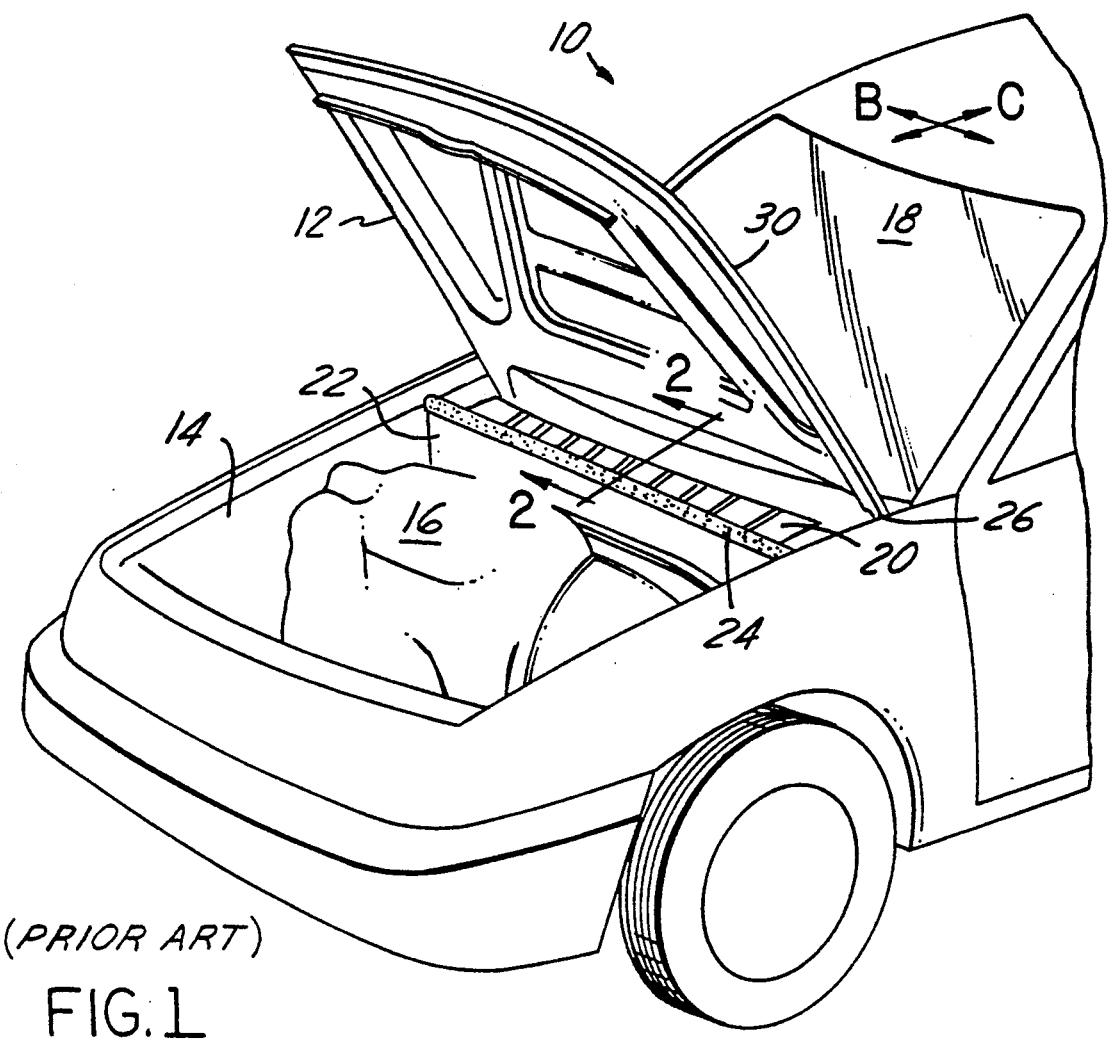
FIG. 1 is a perspective view of a typical automotive vehicle having a known hood member.
Figure 3:
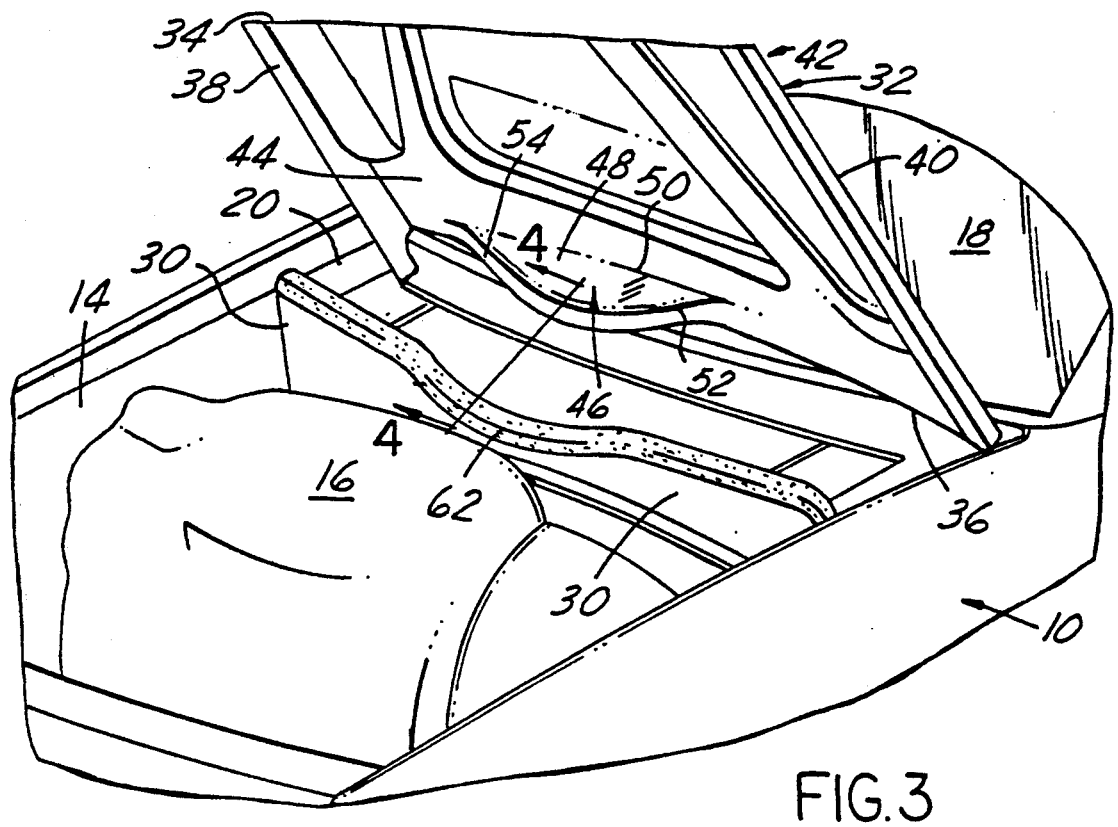
FIG. 3 is a perspective view of an automotive vehicle structured in accord with the principles of the present invention.

Referring now to the drawings, particularly FIG. 3, an automotive vehicle 10 includes structure similar to the vehicle shown in FIG. 1. For ease of reference, the same reference numerals used in FIG. 1 will be used in FIG. 3 to designate like parts. The vehicle 10 in FIG. 3 includes an engine compartment 14, an engine 16 transversely mounted therein as well as a windshield 18 and a ventilation opening 20 disposed forward of the windshield 18 and rearward of the engine compartment 14. Vehicle 10 further includes a cross rail member 30, such as the cowl or dash panel, separating the engine compartment 14 and the ventilation opening 20. Vehicle 10 further includes a generally planar hood member 32 having a leading edge 34, a trailing edge 36 and a pair of outboard edges disposed therebetween 38, 40. The hood member 32 defines a top face 42 and a bottom face 44 located over the engine compartment 14.

As can be seen in FIG. 3, the trailing edge 36 of the hood further includes a seal engaging member, or closure projection 46 secured thereto at a predetermined location between the outboard edges 38, 40 of the hood member 32. The seal engaging member 46 is disposed generally parallel to the transverse axis of the vehicle (line B) and includes a generally planar web 48 depending vertically from the bottom face 44 of the hood member 32.

The web 48 can be fabricated from a synthetic polymeric material or a metal alloy and can be formed integrally with the hood member 32 or secured thereto through any number of known fastening means, such as threaded or rod fasteners or by welding. The web 48 includes a first edge 50 secured to the bottom face 44 of the hood member 32 as well as a free edge 52. The web has a predetermined width between the outboard edges 38, 40 of hood member 32, disposed generally parallel to the transverse axis of the vehicle, and has a predetermined height along a vertical axis depending from the hood. In one embodiment, the height of the web tapers from a lesser amount at its outboard edges 54 to a greater amount of approximately two to four inches proximate a plane bisecting a web into two equal parts. Alternatively, the web could be generally arcuate-shaped or could be any of a number of alternative shapes such as trapezoidal, triangular, polygonal or the like. In the preferred embodiment, the web 48 has a height which varies along its transverse axis such that the height is at a minimum at its outboard edges and tapers to greater amounts therebetween.

As further shown in FIG. 3, the cross rail member 30, such as the cowl or dash panel, includes a depression 62 of predetermined shape along its transverse axis. The depression 62 is configured to matingly receive the free edge 52 of web 48 therein and to provide for sealing of the engine compartment from the ventilation opening 20. An elastomeric strip 64 extends the entire transverse length of the upper edge 36 of the cross rail member 30 and mates with the free edge 52 of the web member 48 when the hood 32 is closed. The elastomeric strip 64 prevents passage of engine compartment fumes into the ventilation opening of the vehicle. Alternatively, the elastomeric strip 64 could be attached to the trailing edge 36 of the hood and extend the entire transverse length of the trailing edge, including over the free end 52 of the web member 48. The strip 64 would mate with the upper edge of the cross rail member 30 when the hood is in the closed position.

Figure 4:
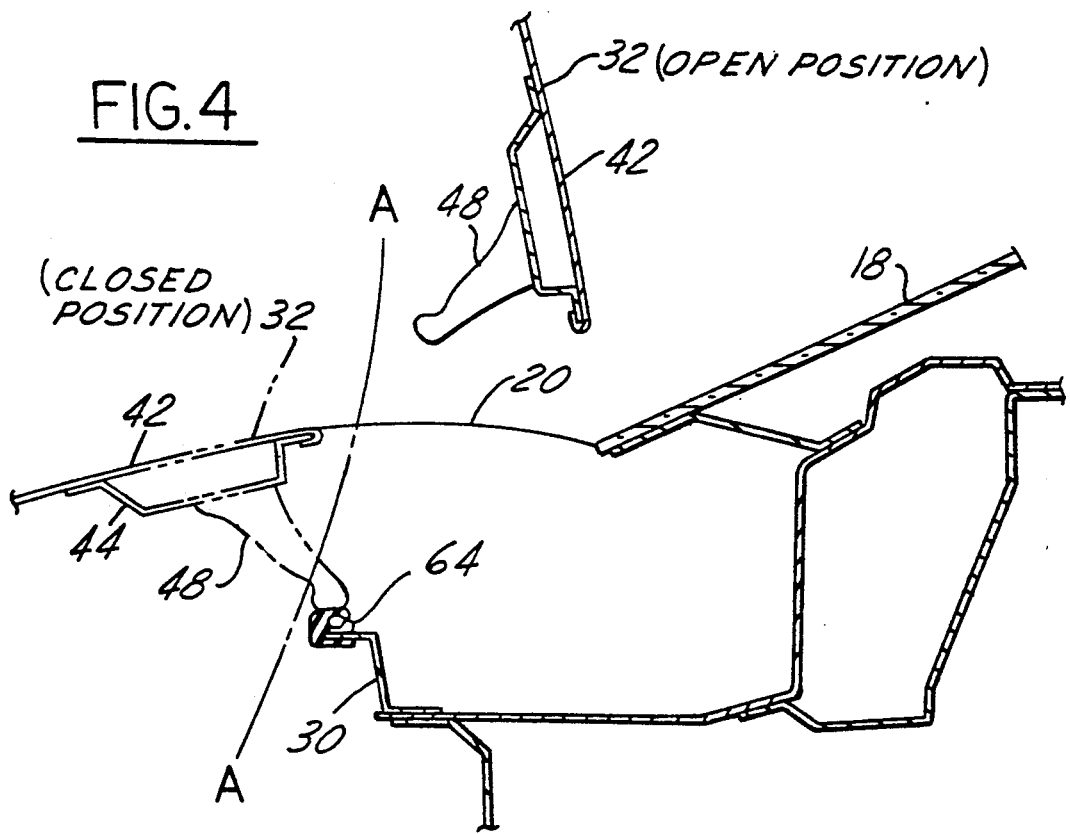
FIG. 4 is a cross sectional view taken along line 4—4 of FIG. 3.

The advantages of the present invention can be seen with respect to FIG. 4. FIG. 4 shows a cross sectional view of FIG. 3 similar to the illustration of FIG. 2. As illustrated, when the hood 32 is opened, the closure projection 46 moves upward and rearward to provide a clear engine service access path as shown by the line A—A defining the access area to the engine compartment. Line A—A is forward of the hood seal 64 even though the windshield 18, the ventilation opening 20 and the hood member 32 have all been moved forward in a cab forward arrangement. By employing the closure projection 46, it is possible to provide access area to the rearward side of the engine 16 in the engine compartment even when the body components of the vehicle are moved forward.

Figure 2:
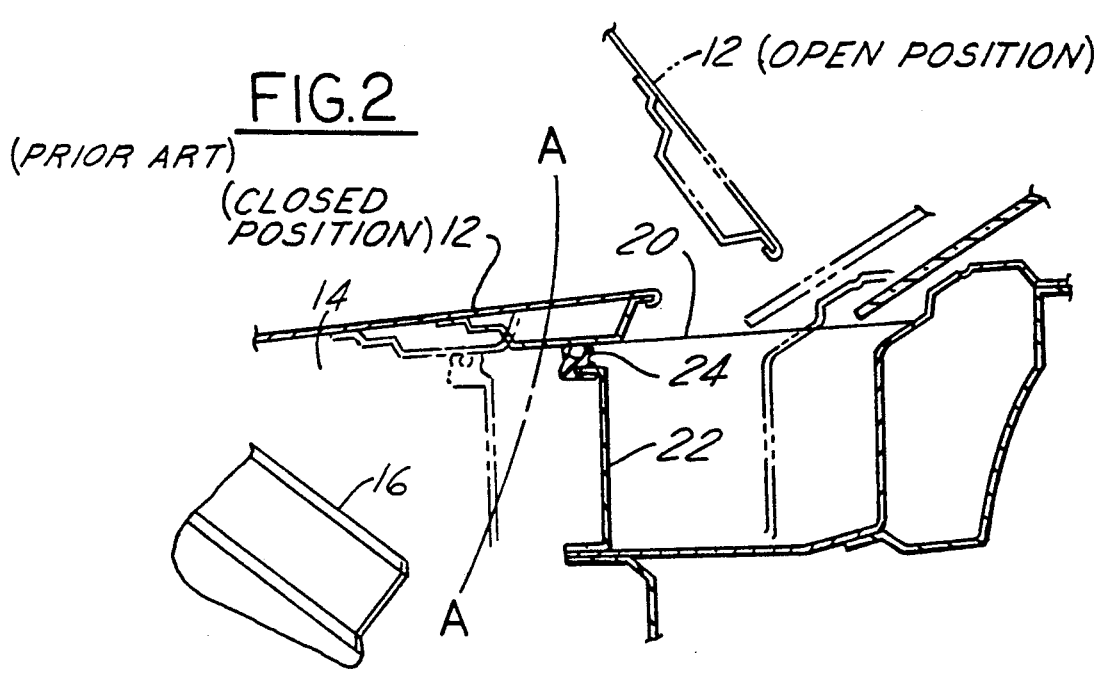
FIG. 2 is a cross sectional view along line 2—2 of FIG. 1.

The present invention is not meant to be limited, however, to employment solely in vehicles having cab forward body styles. The present invention will also provide greater amounts of access to the engine compartment area in current Production vehicles by increasing the distance between the line defining the engine access area and the hood seal in much the same way as shown in FIGS. 2 and 4 herein. The present invention also provides for adequate sealing of the engine compartment to prevent the passage of engine compartment fumes into the ventilation opening.

Various modifications and variations will no doubt occur to those skilled in the arts to which this invention pertains. For example, many variations in the geometric shape of the closure projection can be used without departing from the spirit and scope of the present invention. It is the following claims, including all equivalents which define the scope of the invention.

What is claimed is:

1. In an automotive vehicle having a hood disposed over an engine compartment and mounted on the vehicle body structure, the hood including a leading edge, a trailing edge and a pair of outboard edges therebetween, the vehicle including a windshield, a ventilation opening disposed forward of the windshield and a cross rail member disposed between the ventilation opening and the engine compartment, a sealing apparatus for providing a seal between the hood and the vehicle body structure, comprising:

a seal engaging member secured to the trailing edge of said hood at a predetermined location between the outboard edges thereof and disposed generally parallel to a transverse axis of said vehicle, said member including a generally planar web depending vertically from said hood and having one edge secured to said hood and one free edge, said web having a predetermined width between the outboard edges of the hood disposed generally parallel to the transverse axis of the vehicle and a predetermined height depending from said hood, the height of said web tapering from a lesser amount at an outboard end thereof to a greater amount at a predetermined location along its free edge; and an elastomeric strip interposed between the trailing edge of said hood and the cross rail member, said strip being operative to prevent passage of engine compartment fumes into said ventilation opening of said vehicle.

2. A sealing apparatus according to claim 1, wherein the height of said web varies between the outboard edges of the hood generally parallel to the transverse axis of the vehicle.

3. A sealing apparatus according to claim 1, wherein the web is generally arcuate-shaped.

4. A sealing apparatus according to claim 1, wherein said web is fabricated from a synthetic polymeric material.

5. A sealing apparatus according to claim 1, wherein said web is fabricated from a metal alloy.

6. A sealing apparatus according to claim 1, wherein said web is secured to said hood by threaded rod fasteners.

7. A sealing apparatus according to claim 1, wherein said web is formed integrally with said hood.

8. A hood apparatus for covering an engine compartment of an automotive vehicle, the vehicle including a windshield ventilation opening disposed forward of the windshield and a crossrail member disposed between the ventilation opening and the engine compartment, the hood apparatus comprising:

a generally planar hood member including a leading edge, a trailing edge and a pair of outboard edges therebetween, and defining a top face and a bottom face located above the engine compartment;

a closure projection secured to the bottom face of said hood member at a predetermined location along the trailing edge thereof and disposed generally parallel to a transverse axis of said vehicle, said closure projection including a generally planar web depending vertically from the bottom face of said hood member and having one edge secured to said bottom face and one free edge, said closure projection being operative to prevent passage of engine compartment fumes from the engine compartment into the ventilation opening of the vehicle; and an arcuate-shaped depression disposed on the cross rail member at a predetermined location along its transverse axis generally parallel to the transverse axis of the vehicle and wherein said free end of said web is configured to matingly engage said depression.

9. A hood apparatus according to claim 8, wherein said hood apparatus further includes an elastomeric strip interposed between said cross rail member and the trailing edge of said hood member including the free edge of said web, said strip being operative to prevent passage of engine compartment fumes into the ventilation opening of said vehicle.

10. A hood apparatus according to claim 8, wherein said web is fabricated from a synthetic polymeric material.

11. A hood apparatus according to claim 8, wherein said web is fabricated from a metal alloy.

12. A hood apparatus according to claim 8, wherein said web is formed integrally with said hood member.

13. A hood apparatus for covering an engine compartment of an automotive vehicle, the vehicle including a windshield, a ventilation opening disposed forward of the windshield and a cross rail member disposed between the ventilation opening and the engine compartment, the hood apparatus comprising:

a generally planar hood member including a leading edge, a trailing edge and a pair of outboard edges therebetween, and defining a top face and a bottom face located above the engine compartment;

a closure projection secured to the bottom face of said hood member at a predetermined location along the trailing edge thereof and disposed generally parallel to a transverse axis of said vehicle, said closure projection including a generally planar web depending vertically from the bottom face of said hood member and having one edge secured to said bottom face and one free edge; said web being configured to matingly engage a generally arcuate-shaped depression disposed at a predetermined location along the transverse axis of said cross rail member generally parallel to the transverse axis of the vehicle; and an elastomeric strip secured to an upper edge of said cross rail member and matingly engageable with the free edge of said web and the trailing edge of said hood member, said strip being operative to prevent passage of engine compartment fumes into the ventilation opening and passenger compartment of the vehicle.

* * * * *